April 22, 1941.  H. R. MILLER  2,238,913
BREAK-IN RELAY
Filed Oct. 23, 1939  2 Sheets-Sheet 1
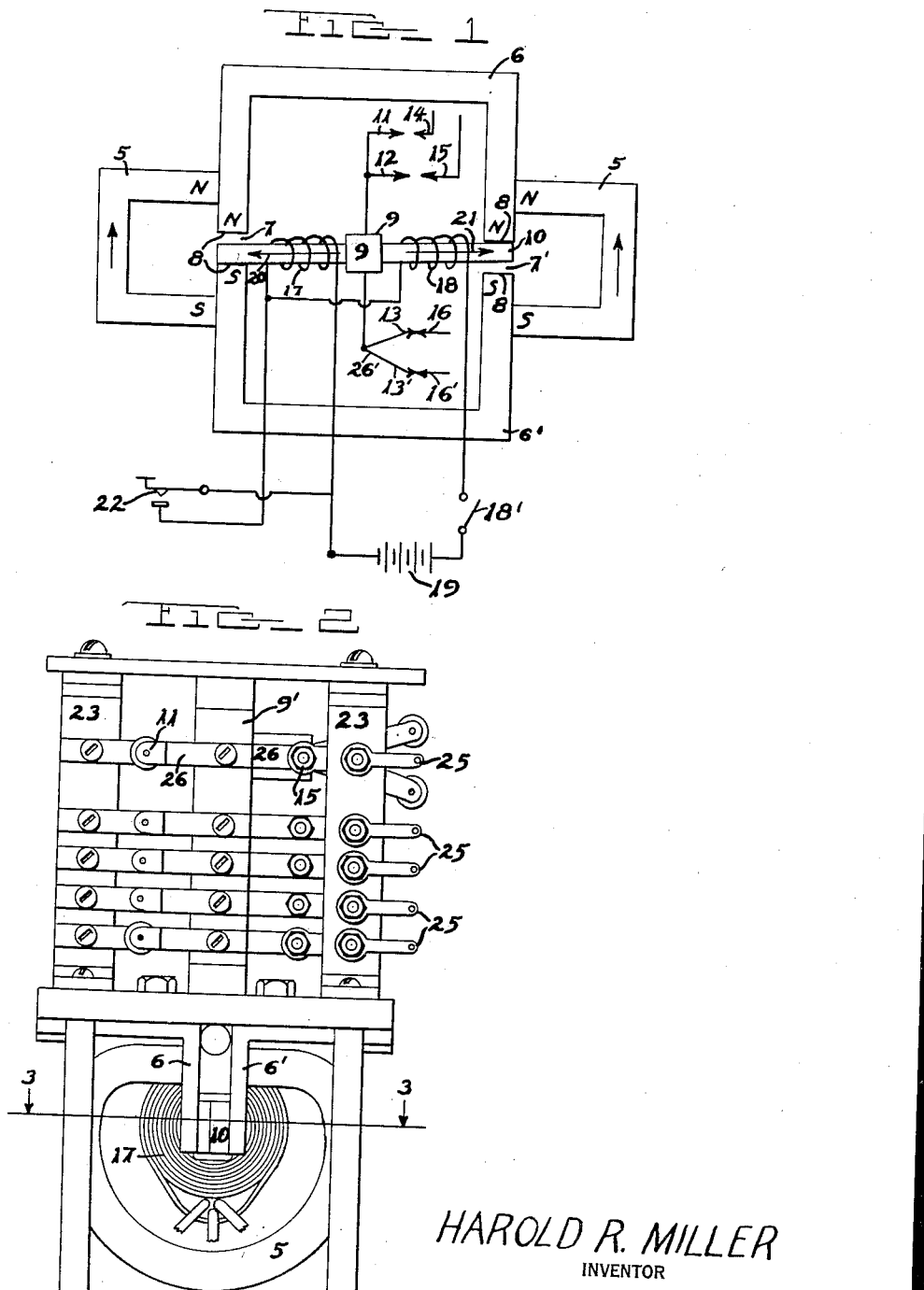
HAROLD R. MILLER
INVENTOR
BY W. Glenn Jones
ATTORNEY

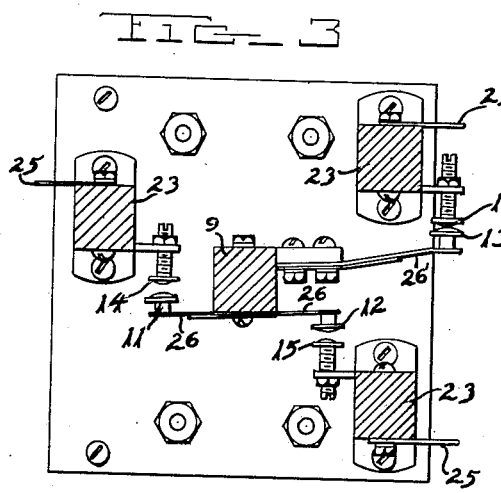
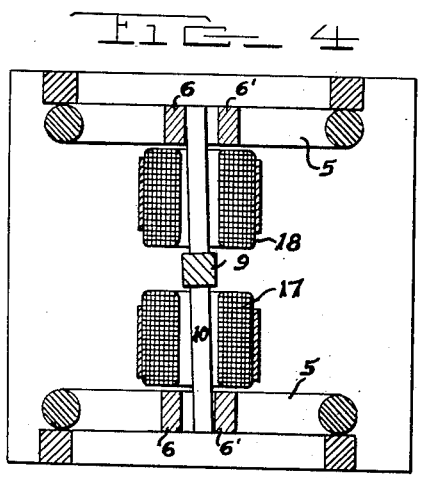

Patented Apr. 22, 1941

2,238,913

UNITED STATES PATENT OFFICE 2,238,913

BREAK-IN RELAY

Harold R. Miller, Washington, D. C.

Application October 23, 1939, Serial No. 300,795

21 Claims. (Cl. 175—320)

(Granted under the act of March 3, 1883, as amended April 30, 1928; 370 O. G. 757)

This invention relates generally to relays and particularly to keying relays for aircraft radio transmitters to provide improved break-in operation.

To provide a satisfactory break-in system for aircraft communication has always presented some difficulties. The requirements of light weight, small power drain, high altitude operation, vibration, and operation with antenna systems which place extremely high radio frequency voltages across relay contacts place rather stringent demands upon the keying relay.

Prior aircraft radio transmitter relays have been somewhat unsatisfactory due to attempts to keep down space and weight and still provide the necessary keying speeds. In an effort to reduce weight, particularly of the moving parts, the contact system has often been rather flimsy. To reduce the power necessary for operation, the springs used have also been weak, thus allowing the armature to bounce and cause poor contact with resulting noise and poor keying action. Light contact arms also require frequent adjustment of the contacts to maintain the proper sequence for good operation. One especially bad feature due to chattering contacts is the noise introduced in the receiver which prevents hearing a "break" signal, that is, when the receiving operator transmits a signal indicating that he desires to interrupt the transmission.

My invention has for its general object to provide an improved break-in relay for aircraft radio transmitting equipment that will fulfill the above requirements and, at the same time, eliminate the deficiencies of present equipment relative to break-in operation.

Another object of my invention is to provide an improved break-in relay for aircraft radio transmitting equipment that utilizes no springs and substitutes therefor complete magnetic control.

Another object of my invention is to provide an improved break-in relay for aircraft radio transmitting equipment that utilizes a positive magnetic lock-in for the armature for both the transmitting and receiving positions with resulting freedom from contact bounce and keying transients.

A further object of my invention is to provide an improved break-in relay for aircraft radio transmitting equipment that is characterized by rapid response of armature motion to the control key position.

With these and other objects in view, I will proceed to describe my invention in connection with the following drawings in which:

Fig. 1 is a schematic plan view showing the elements of my invention, including its electrical and magnetic circuits;

Fig. 2 is a side view of a relay incorporating my invention;

Fig. 3 is a plan view of the relay of Fig. 2 with the top cover removed; and

Fig. 4 is a sectional view of the relay of Fig. 2 through a line 3—3 of Fig. 2.

My invention consists essentially of a magnetic control system and a contact system, both of which are shown schematically in Fig. 1. Referring to Fig. 1, permanent magnets 5, the north and south poles of each of which are marked N and S respectively, are provided with keepers 6, 6' which connect magnetically the like poles of magnets 5. The keepers and magnets are so disposed that air gaps of high magnetic flux density are formed at 7 and 7' between the faces 8 of the keepers. The polarity of the keeper faces is indicated on Fig. 1 by the letters N and S in the same manner that the polarity of magnets 5 is indicated. A shaft 9 is disposed centrally with respect to keepers 6, 6' and supports a low reluctance iron armature 10. Shaft 9 rotates through a portion of a revolution as armature 10 oscillates between the faces 8 of keepers 6, 6'. An extension 9' of shaft 9 is formed of electrically insulating material and carries a plurality of contacts of which only movable contacts 11, 12, 13 and 13' and fixed contacts 14, 15, 16 and 16' are shown in Fig. 1. Fixed coils 17 and 18 are so disposed that armature 10 passes through the air core of each. Coils 17 and 18 are connected in series with switch 18' across direct potential source 19 and are so wound as to produce a magnetic flux in armature 10 in opposite directions. Thus, coil 17 produces magnetic flux in armature 10, which has the direction of arrow 20, while the magnetic flux produced by coil 18 has the direction of arrow 21. Thus, the effect of coil 17 is to produce a north magnetic pole at the left end (Fig. 1) of armature 10 and a south magnetic pole at the right end; while the effect of coil 18 is to produce a north magnetic pole at the right end of armature 10 and a south magnetic pole at the left end. Further, coil 17 has such a number of turns as to produce a flux in armature 10 of considerably greater strength than that produced by coil 18. An additional circuit including key 22 is provided which, when key 22 is depressed, short circuits coil 17. Thus, it is apparent that when key 22 is not depressed current from source 19 flows through both coils 17 and 18. When key 22 is depressed current continues to flow through coil 18 but little or no current flows through coil 17 as it is short circuited by the circuit including key 22. Armature 10 oscillates within the air core of coils 17 and 18 without touching either coil.

Now, referring to Figs. 2, 3, and 4, which show a mechanical structure incorporating my invention, magnets 5 are shown as modified C-shaped rods of circular cross section, while keepers 6, 6' are L-shaped bars. Shaft 9 is shown vertical although the relay will operate satisfactorily in any position such as it might be required to assume in an aircraft. The disposition of coils 17 and 18 with reference to the armature 10 is essentially as shown in Fig. 1. Figs. 2 and 3 show in considerable detail one form of contact system that may be employed. The extension 9' of shaft 9 supports a plurality of movable contacts of which contacts 11, 12, 13 and 13' are representative. Fixed contacts 14, 15, 16 and 16' are disposed opposite to movable contacts 11, 12, 13 and 13' respectively, and are supported by insulating posts 23. Each fixed contact is provided with a terminal 25 for connection to an external circuit. Contacts 11 and 12 are shown interconnected and bear against fixed contacts 14 and 15 respectively when armature 10 is in a position opposite to that shown, thus electrically connecting fixed contact 14 to fixed contact 15. Movable contacts 13 and 13' (shown only in Fig. 1) are both supported by a Y-shaped flexible conductive arm 26' and electrically connect fixed contact 16 to fixed contact 16' with the armature in the position shown. Fig. 3 shows only one possible arrangement of one group of contacts. It is obvious that a plurality of groups of contacts as shown in Fig. 2 may be employed in a wide range of arrangements. The movable contacts are secured to flexible arms 26. The fixed contacts are adjustable as shown.

In operation, with switch 18' closed (Figs. 1 and 3), with key 22 in the position shown, current supplied by source 19 flows through both coils 17 and 18, each of which sets up a flux in armature 10. However, since the flux produced by coil 17 is of greater strength and is opposite in direction to that produced by coil 18, the resultant flux in armature 10 is in the same direction as that produced by coil 17 alone, as indicated by arrow 20, and a north magnetic pole is formed at the left end (Fig. 1) of armature 10 while a south magnetic pole is formed at its right end. When such occurs, the north pole of armature 10 is attracted by the south pole at the left end of keeper 6' and simultaneously the south pole at the right end of armature 10 is attracted by the north pole at the right end of keeper 6. This magnetic attraction causes armature 10 and shaft 9 to rotate in a counterclockwise direction until the right or south pole end of armature 10 bears against the right face of keeper 6 and the left or north pole end of armature 10 bears against the left face of keeper 6'. Armature 10 is shown in this position in Fig. 1. Extension 9' rotates counterclockwise with shaft 9, causes movable contacts 13 and 13' to bear against fixed contact 16, and 16', respectively, and at the same time, causes movable contacts 11 and 12 to move away from fixed contacts 14 and 15 respectively. This closes the electrical circuit between fixed contacts 16 and 16' and opens or breaks the circuit between fixed contacts 14 and 15. In the same manner that the electrical circuits including contacts 11 to 16, inclusive, are opened or closed by this rotation of shaft extension 9' so also will the electrical circuits including the other contacts be similarly affected.

Now, with switch 18' still closed, if key 22 is depressed the current from source 19 flows through coil 18 as before, but the very great portion of the current bypasses coil 17 and flows through the circuit including key 22. Thus, coil 17 produces little or no flux, while coil 18 produces increased flux due to the increased current flow through it, the resistance of coil 17 being short circuited by key 22. Since the flux produced by coil 18 has the direction indicated by arrow 21, such will cause a north magnetic pole at the right end of armature 10 and a south magnetic pole at the left end. The south magnetic pole face at the left end of keeper 6' now repels the left or south pole end of armature 10, while the south pole face at the right end of keeper 6' attracts the right or north pole end of the armature. Simultaneously, the left or south pole end of armature 10 is attracted by the left north magnetic pole face of keeper 6 and the right or north pole end of the armature is repelled by the right north pole face of this same keeper. Such results in armature 10, shaft 9 and shaft extension 9' rotating clockwise until armature 10 bears against the right pole face of keeper 6' and the left pole face of keeper 6. This rotation of shaft extension 9' causes movable contact 11 to bear against fixed contact 14, movable contact 12 to bear against fixed contact 15, and movable contacts 13 and 13' to move away from fixed contacts 16 and 16' respectively. This completes the electrical circuit between fixed contacts 14 and 15, opens the electrical circuit between fixed contacts 16 and 16', and affects in a similar manner the electrical circuits including the other contacts.

If switch 18' be opened with armature 10 in either position, no current will flow in either coil 17 or 18 and no flux will be produced by either of these coils in armature 10. However, permanent magnets 5 have adequate strength to hold the armature firmly in place. In the usual arrangement, switch 18' will be closed only when the aircraft radio transmitter is energized.

A type of magnetic material suitable for use in the permanent magnet system is alnico, and the use of such material in the manufacture of magnets 5 and keepers 6, 6' insures long life and very satisfactory results. For contact posts 23, I prefer micalex or isolantite. For arms 26 laminated beryllium copper is eminently suitable. I have used silver in the manufacture of the contacts. Other materials known to those skilled in the art may be employed without departing from the scope of this invention.

In the operation of my invention, provision is made for a continuous short circuit across both permanent magnets 5 in both the key up and key down positions, to provide a condition favorable to the stability of the magnets and to maintain their field strength.

My invention is designed for use with single circuit telegraph keys now in general use. No additional contacts or switches are needed to operate the relay and cause the armature to move from one position to the other. The circuit including key 22 is of the low voltage, low current type, resulting in long life for the key contacts and in the elimination of danger to operating personnel. The relay incorporating my invention and shown in the figures requires only 0.4 ampere at 12 volts for its operation and weighs only two pounds. Its dimensions are approximately 4½″ x 3¼″ x 3″ and its size could easily be further reduced by the use of more compact permanent magnets 5. It can successfully be used at keying speeds in excess of 40 words per minute. Cathode ray observation of break-in operation through a typical radio receiver when operated on an antenna shows a square cut pattern without transients.

Due to the increased length of arm 26′, the air gap between contacts 13 and 16 and between contacts 13′ and 16′, when these contacts are open, has greater length. This is done in order that these contacts may carry the high voltage antenna current without it jumping across the air gaps. Obviously, by further increasing the length of arm 26′, the aforementioned air gaps can be further increased, if desired.

While two magnets with their necessary connecting strips are shown in the construction of my invention, as such is the normal arrangement for economy of weight and space and for most efficient operation, it is obvious, from the preceding explanation, that my invention will operate if only a single magnet is used, such magnet acting on one end of the armature, with that end of the armature oscillating between the pole faces of the magnet as the telegraph key is operated. The magnetic system of my invention as shown can also be considered as a single magnet having two parts operating in parallel.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. An electro-magnetic relay means, comprising two permanent magnets each having a north pole and a south pole, a keeper disposed to magnetically connect the north pole of one said magnet to the north pole of the other, another keeper disposed to magnetically connect the south pole of one said magnet to the south pole of the other said magnet, each said keeper having two pole faces of like polarity, the pole faces of one said keeper being disposed opposite the pole faces of the other said keeper forming two air gaps, an armature pivoted at its center arranged to oscillate in said air gaps, two oppositely wound air core coils electrically connected in series across a direct potential source, said armature passing through the air core of both said coils, a circuit closing means connected to short circuit one said coils when closed, both said coils producing a magnetic flux in said armature, the coil connected to be short circuited by said circuit closing means producing a flux of substantially greater strength and in the opposite direction to that produced by the other said coil, the operation of said closing means causing said armature to oscillate, a shaft fixedly secured to said armature at its pivotal point and rotatable through a portion of a revolution as said armature oscillates, one or more movable contacts supported by said shaft and rotatable therewith, a fixed contact disposed opposite each said movable contact, the rotation of said shaft making and breaking the electrical contact between each movable contact and the fixed contact opposite.

2. An electro-magnetic relay means, comprising two magnets each having a north pole and a south pole, a keeper disposed to magnetically connect the north pole of one said magnet to the north pole of the other, another keeper disposed to magnetically connect the south pole of one said magnet to the south pole of the other said magnet, each said keeper having two pole faces of like polarity, the pole faces of one said keeper being disposed opposite the pole faces of the other said keeper forming two air gaps, two coils electrically connected in series across a direct potential source, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the operation of said closing means causing said armature to oscillate, a shaft fixedly secured to said armature at its pivotal point and rotatable through a portion of a revolution as said armature oscillates, one or more movable contacts supported by said shaft and rotatable therewith, a fixed contact disposed opposite each said movable contact, the rotation of said shaft making and breaking the electrical contact between each movable contact and the fixed contact opposite.

3. An electro-magnetic relay means, comprising two magnets each having a north pole and a south pole, a keeper disposed to magnetically connect the north pole of one said magnet to the north pole of the other, another keeper disposed to magnetically connect the south pole of one said magnet to the south pole of the other said magnet, each said keeper having two pole faces of like polarity, the pole faces of one said keeper being disposed opposite the pole faces of the other said keeper forming two air gaps, an armature arranged to oscillate in said air gaps, two coils electrically connected in series across a direct potential source, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the operation of said closing means causing said armature to oscillate, a shaft fixedly secured to said armature rotatable through a portion of a revolution as said armature oscillates, one or more movable contacts supported by said shaft and rotatable therewith, a fixed contact disposed opposite each said movable contact, the rotation of said shaft making and breaking the electrical contact between each movable contact and the fixed contact opposite.

4. An electro-magnetic relay means, comprising two magnets each having a north pole and a south pole, a keeper disposed to magnetically connect the north pole of one said magnet to the north pole of the other, another keeper disposed to magnetically connect the south pole of one said magnet to the south pole of the other said magnet, each said keeper having two pole faces of like polarity, the pole faces of one said keeper being disposed opposite the pole faces of the other said keeper forming two air gaps, an armature arranged to oscillate in said air gaps, two coils electrically connected in series across a direct potential source, a circuit closing means connected to short circuit one said coil when closed, the coil connected to be short circuited by said circuit closing means producing a flux of substantially greater strength and in the opposite direction to that produced by the other said coil, the operation of said closing means causing said armature to oscillate, a shaft fixedly secured to said armature rotatable through a portion of a revolution as said armature oscillates, one or more movable contacts supported by said shaft and rotatable therewith, a fixed contact disposed opposite each said movable contact, the rotation of said shaft making and breaking the electrical contact between each movable contact and the fixed contact opposite.

5. An electro-magnetic relay means, comprising two permanent magnets each having a north pole and a south pole disposed oppositely with an air gap between, an armature pivoted at its center and arranged to oscillate in said air gaps, two oppositely wound air core coils electrically connected in series across a direct potential source, said armature passing through the air core of both said coils, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the operation of said circuit closing means causing said armature to oscillate, a shaft fixedly secured to said armature at its pivotal point and rotatable through a portion of a revolution as said armature oscillates, one or more movable contacts supported by said shaft and rotatable therewith, and a fixed contact disposed opposite each said movable contact, the rotation of said shaft making and breaking the electrical contact between each said movable contact and the fixed contact opposite.

6. An electro-magnetic relay means, comprising two permanent magnets each having a north pole and a south pole disposed oppositely with an air gap between, an armature pivoted at its center and arranged to oscillate in said air gaps, two coils electrically connected in series across a direct potential source, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the operation of said circuit closing means causing said armature to oscillate, a shaft fixedly secured to said armature at its pivotal point and rotatable through a portion of a revolution as said armature oscillates, one or more movable contacts supported by said shaft and rotatable therewith, and a fixed contact disposed opposite each said movable contact, the rotation of said shaft making and breaking the electrical contact between each said movable contact and the fixed contact opposite.

7. An electro-magnetic relay means, comprising two permanent magnets each having a north pole and a south pole disposed oppositely with an air gap between, an armature pivoted at its center and arranged to oscillate in said air gaps, two coils electrically connected in series across a direct potential source, a circuit closing means connected to short circuit one said coil when closed, the coil connected to be short circuited by said circuit closing means producing a flux of substantially greater strength and in the opposite direction to that produced by the other said coil, the operation of said circuit closing means causing said armature to oscillate, a shaft fixedly secured to said armature at its pivotal point and rotatable through a portion of a revolution as said armature oscillates, one or more movable contacts supported by said shaft and rotatable therewith, and a fixed contact disposed opposite each said movable contact, the rotation of said shaft making and breaking the electrical contact between each said movable contact and the fixed contact opposite.

8. An electro-magnetic relay means, comprising two magnets each having a north pole and a south pole disposed oppositely with an air gap between, an armature arranged to oscillate in said air gaps, two coils electrically connected in series across a direct potential source, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the operation of said circuit closing means causing said armature to oscillate, a shaft fixedly secured to said armature and rotatable through a portion of a revolution as said armature oscillates, one or more movable contacts supported by said shaft and rotatable therewith, and a fixed contact disposed opposite each said movble contact, the rotation of said shaft making and breaking the electrical contact between each said movable contact and the fixed contact opposite.

9. In combination, two permanent magnets each having a north pole and a south pole disposed oppositely with an air gap between, an armature pivoted at its center and arranged to oscillate in said air gaps, two oppositely wound air core coils electrically connected in series across a direct potential source, said armature passing through the air core of said coils, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the alternate closing and opening of said circuit closing means causing said armature to oscillate.

10. In combination, two permanent magnets each having a north pole and a south pole disposed oppositely with an air gap between, an armature pivoted at its center and arranged to oscillate in said air gaps, two oppositely wound coils electrically connected in series across a direct potential source, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the alternate closing and opening of said circuit closing means causing said armature to oscillate.

11. In combination, two magnets each having a north pole and a south pole disposed oppositely with an air gap between, an armature arranged to oscillate in said air gaps, two air core coils electrically connected in series across a direct potential source, said armature passing through the air core of said coils, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the alternate closing and opening of said circuit closing means causing said armature to oscillate.

12. In combination, two magnets each having a north pole and a south pole disposed oppositely with an air gap between, an armature arranged to oscillate in said air gaps, two coils electrically connected in series across a direct potential source, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the alternate closing and opening of said circuit closing means causing said armature to oscillate.

13. In combination, two magnets each having a north pole and a south pole disposed oppositely with an air gap between, an armature arranged to oscillate in said air gaps, two coils electrically connected in series across a direct potential source, a circuit closing means connected to short circuit one said coil when closed, the coil connected to be short circuited by said circuit closing means producing a flux of substantially greater strength and in the opposite direction to that produced by the other said coil, the alternate closing and opening of said circuit closing means causing said armature to oscillate.

14. In combination, a magnet having a north and a south pole disposed oppositely with an air gap between, an armature pivoted at its center and arranged to oscillate in said air gap, two oppositely wound air core coils electrically connected in series across a direct potential source, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the alternate closing and opening of said circuit closing means causing said armature to oscillate.

15. In combination, a magnet having a north and a south pole disposed oppositely with an air gap between, an armature arranged to oscillate in said air gap, two oppositely wound air core coils electrically connected in series across a direct potential source, a circuit closing means connected to short circuit one said coil when closed, both said coils producing a magnetic flux in said armature, the coil connected to be short circuited by said circuit closing means producing a flux of substantially greater strength and in the opposite direction to that produced by the other said coil, the alternate closing and opening of said circuit closing means causing said armature to oscillate.

16. In combination, a magnet having a north and a south pole disposed oppositely with an air gap between, an armature arranged to oscillate in said air gap, two oppositely wound air core coils electrically connected in series across a direct potential source, a circuit closing means connected to short circuit one said coil when closed, the coil connected to be short circuited by said circuit closing means producing a flux of substantially greater strength and in the opposite direction to that produced by the other said coil, the alternate closing and opening of said circuit closing means causing said armature to oscillate.

17. In combination, a magnet having a north and a south pole disposed oppositely with an air gap between, an armature arranged to oscillate in said air gap, two oppositely wound coils electrically connected in series across a direct potential source, a circuit closing means connected to short circuit one said coil when closed, the coil connected to be short circuited by said circuit closing means producing a flux of substantially greater strength and in the opposite direction to that produced by the other said coil, the alternate closing and opening of said circuit closing means causing said armature to oscillate.

18. In combination, a magnet having a north pole and a south pole disposed oppositely with an air gap between, an armature pivoted at its center and arranged to oscillate in said air gap, a first coil and an oppositely-wound second coil having a greater number of turns, said coils being electrically connected in series across a source of electromotive force, each said coil having an air core, said armature passing through said air cores, means for alternately closing and opening a path of comparatively low resistance across said second coil, each said coil producing a magnetic flux in said armature, said flux produced by said first coil being in opposition to that produced by said second coil, said flux produced by said second coil being of substantially greater strength than that produced by said first coil when said path is open, said flux produced by said second coil being of substantially less strength than that produced by said first coil when said path is closed, the alternate opening and closing of said path causing said armature to oscillate, and a contact means operated by the oscillation of said armature.

19. In combination, a magnet having a north pole and a south pole disposed oppositely with an air gap between, an armature pivoted at its center and arranged to oscillate in said air gap, a first coil and an oppositely-wound second coil having a greater number of turns, said coils being electrically connected in series across a source of electromotive force, each said coil having an air core, said armature passing through said air cores, means for alternately closing and opening a path of comparatively low resistance across said second coil, each said coil producing a magnetic flux in said armature, said flux produced by said first coil being in opposition to that produced by said second coil, said flux produced by said second coil being of substantially greater strength than that produced by said first coil when said path is open, said flux produced by said second coil being of substantially less strength than that produced by said first coil when said path is closed, the alternate opening and closing of said path causing said armature to oscillate.

20. In combination, a magnet having a north pole and a south pole disposed oppositely with an air gap between, an armature arranged to oscillate in said air gap, a first coil and a second coil having a greater number of turns, said coils being electrically connected in series across a source of electromotive force, means for alternately closing and opening a path of comparatively low resistance across said second coil, each said coil arranged to produce a magnetic flux in said armature, said flux produced by said first coil being in opposition to that produced by said second coil, said flux produced by said second coil being of substantially greater strength than that produced by said first coil when said path is open, said flux produced by said second coil being of substantially less strength than that produced by said first coil when said path is closed, the alternate opening and closing of said path causing said armature to oscillate, and a contact means operated by the oscillation of said armature.

21. In combination, a magnet having a north pole and a south pole disposed oppositely with an air gap between, an armature arranged to oscillate in said air gap, a first coil and a second coil having a greater number of turns, said coils being electrically connected in series across a source of electromotive force, means for alternately closing and opening a path of comparatively low resistance across said second coil, each said coil arranged to produce a magnetic flux in said armature, said flux produced by said first coil being in opposition to that produced by said second coil, said flux produced by said second coil being of substantially greater strength than that produced by said first coil when said path is open, said flux produced by said second coil being of substantially less strength than that produced by said first coil when said path is closed, the alternate opening and closing of said path causing said armature to oscillate.

HAROLD R. MILLER.